US008158079B2

(12) United States Patent
Sugimoto et al.

(10) Patent No.: US 8,158,079 B2

(45) Date of Patent: Apr. 17, 2012

(54) PANEL FOR ANALYSIS AND ANALYZER USING THE SAME

(75) Inventors: Hirofumi Sugimoto, Toon (JP); Masaaki Kito, Toon (JP); Masakazu Mori, Toon (JP); Shinichi Ninomiya, Toon (JP); Noriyuki Shinohara, Toon (JP); Hiroshi Takano, Toon (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 12/305,222

(22) PCT Filed: Jun. 27, 2007

(86) PCT No.: PCT/JP2007/062858

§ 371 (c)(1), (2), (4) Date: Dec. 17, 2008

(87) PCT Pub. No.: WO2008/001796

PCT Pub. Date: Jan. 3, 2008

(65) Prior Publication Data

US 2009/0205447 A1 Aug. 20, 2009

(30) Foreign Application Priority Data

Jun. 30, 2006 (JP) ................................ 2006-180669

(51) Int. Cl.
*G01N 21/84* (2006.01)

(52) U.S. Cl. ............ 422/402; 422/72; 356/246; 436/45; 436/518; 435/7.25; 435/24; 435/287.2

(58) Field of Classification Search .................... 422/58, 422/61, 72, 102; 436/45

See application file for complete search history.

(56) References Cited

U.S. PATENT DOCUMENTS

| | | | | |
|---|---|---|---|---|
| 4,883,763 | A * | 11/1989 | Holen et al. | 436/45 |
| 6,776,965 | B2 | 8/2004 | Wyzgol | |
| 7,604,775 | B2 | 10/2009 | Pollock | |
| 7,662,340 | B2 | 2/2010 | Nagaoaka | |
| 7,678,577 | B2 | 3/2010 | Horiike | |
| 7,901,875 | B2 | 3/2011 | Stiene | |
| 2004/0241051 | A1 | 12/2004 | Wyzgol et al. | 422/100 |

FOREIGN PATENT DOCUMENTS

| | | |
|---|---|---|
| JP | 60-154160 | 8/1985 |
| JP | 04-504758 | 8/1992 |
| JP | 2002-243748 | 8/2002 |
| JP | 2003-185671 | 7/2003 |
| JP | 2004-132962 | 4/2004 |
| JP | 2004-239743 | 8/2004 |
| JP | 2005-249796 | 9/2005 |
| JP | 2006-52949 | 2/2006 |
| JP | 2006-158335 | 6/2006 |
| WO | 90/13016 | 11/1990 |
| WO | 03/059484 | 7/2003 |

* cited by examiner

*Primary Examiner* — Sally Sakelaris

(74) *Attorney, Agent, or Firm* — Steptoe & Johnson LLP

(57) ABSTRACT

Provided is a panel (3) for analysis having a chamber inside for transferring a sample liquid dispensed as a drop on an injection port (14). The injection port (14) is formed to protrude in a direction away from the chamber, a recessed section (12) is formed around the injection port (14), and the injection port (14) is arranged on the side of a rotating axis center (11) of a holding member (101) for the panel for analysis in an analyzer. Thus, even when a sample liquid is adhered around the injection port, contamination and shortage of the sample liquid can be prevented.

12 Claims, 15 Drawing Sheets

PANEL FOR ANALYSIS AND ANALYZER USING THE SAME

The present application is based on International Application PCT/JP2007/062858 filed Jun. 27, 2007, which claims priority to Japanese Patent Application No. 2006-180669, filed Jun. 30, 2006, the entire contents of which are hereby incorporated by reference.

TECHNICAL FIELD

The present invention relates to a panel for analysis and an analyzer for measuring a reactive state of a sample liquid and an analyzing reagent, and more specifically, to a structure of an injection port of a panel for analysis to be used in an analyzer for component measurement of a sample liquid and to a transfer unit that transfers a sample liquid adhered in the vicinity of the injection port.

BACKGROUND ART

Conventionally, an analyzer has been put to practical use which uses a panel for analysis having a sample liquid set inside and which analyzes characteristics of the sample liquid using an optical scanning technique while rotating a disk for analysis mounted with the panel around an axis center.

In recent years, with various needs from the market such as for smaller amounts of sample liquids, downsizing of apparatuses, shorter measurement times, and simultaneous measurement of multiple items, there has been a demand for an analyzer with higher accuracy capable of reacting a sample liquid such as blood with various analyzing reagents, detecting the mixture of the same, and examining progresses of various diseases in a short period of time.

For example, a configuration shown in FIGS. 20A and 20B is described in Patent Document 1.

In a state where a panel 203 for analysis is mounted on a holding member 204 for the panel for analysis of a disk 201 for analysis as shown in FIG. 20B, the disk 201 for analysis shown in FIG. 20A is rotated around a rotating axis center 202 to optically analyze a sample liquid.

The panel 203 for analysis which is detachable to the disk 201 for analysis includes a sample liquid injection port 214, a cavity 208 communicating with the injection port 214, and an air inlet 210 communicating with the cavity 208. The injection port 214 is formed on an end face of the panel 203 for analysis so as to facilitate injection of a sample liquid, an absorbing member 215 is formed on the disk 201 for analysis at a position corresponding to the position of the injection port 214 of the panel 203 for analysis, whereby the absorbing member 215 absorbs just an appropriate amount of a sample liquid adhered around the injection port 214 of the panel 203 for analysis. In the state where the panel 203 for analysis is mounted on the holding member 204 for the panel for analysis, the injection port 214 of the panel 203 for analysis is hermetically closed by the absorbing member 215.

A flow channel is formed in the cavity 208 of the panel 203 for analysis such that the flow channel is positioned further towards the outer periphery of the disk 201 for analysis as seen from the injection port 214 and the air inlet 210. An analyzing reagent 209 to react with the sample liquid is applied midway along the flow channel of the cavity 208.

In an analysis operation using the panel 203 for analysis, when the sample liquid is dispensed as a drop on the injection port 214 of the panel 203 for analysis in a state where the panel 203 for analysis is removed from the disk 201 for analysis, the sample liquid is transferred by capillary force into the cavity 208 communicating with the injection port 214.

When the panel 203 for analysis to which the sample liquid has been set is mounted to the holding member 204 for the panel for analysis of the disk 201 for analysis, an opening of the injection port 214 is closed by the disk 201 for analysis. At this point, since a sample liquid adhered to an end face of the injection port 214 comes into contact with and is absorbed by the absorbing member 215, it is possible to prevent adherence of the sample liquid to a position opposing the injection port 214 or dispersal of the sample liquid during rotation of the disk 201 for analysis, enabling subsequent analytical tests of the sample liquid to be performed safely.

Patent Document 1: Japanese Patent Laid-Open No. 2003-185671

However, when absorbing the sample liquid adhered around the injection port 214 with the absorbing member 215, the sample liquid injected into the cavity 208 of the panel 203 for analysis is also absorbed disadvantageously by the absorbing member 215, causing a shortage of a sample liquid necessary for mixture with the analyzing reagent 209 and affecting the measurement of a reactive state of the analyzing reagent 209 and the sample liquid.

In addition, since the absorbing member 215 is provided on the side of the disk 201 for analysis, when repetitively using the disk 201 for analysis, the sample liquid adhered around the injection port 214 is absorbed by the absorbing member 215 every time the panel 203 for analysis is mounted to the disk 201 for analysis to perform analysis, causing the absorbing member 215 to be gradually contaminated by the sample liquid. Such a contamination creates a risk of adversely affecting a measurement due to a contaminated substance mixed into the sample liquid, or a risk of an operator being infected with a disease by touching the contaminated absorbing member 215. Furthermore, such a contamination is disadvantageous in terms of safety management because the need arises for arduous tasks such as replacing the absorbing member 215 with a new absorbing member 215 or cleaning the absorbing member 215 every time an analysis is performed.

The present invention has been made to solve the problems described above and provides a panel for analysis and an analyzer using the same which are capable of avoiding situations that may affect measurement such as a shortage of a sample liquid or contamination even when a sample liquid adheres around the injection port 214.

DISCLOSURE OF THE INVENTION

A panel for analysis according to a first aspect of the present invention is a panel for analysis in which an injection port for a sample liquid is provided on one lateral face of a panel main body, a chamber communicating with the injection port and through which is transferred the sample liquid dispensed as a drop on the injection port is provided inside the panel main body, and the panel main body is rotated in a state where the injection port is disposed on the side of a rotating axis center to perform an analysis of components of the sample liquid at the chamber, wherein the injection port is shaped so as to protrude from the one lateral face of the panel main body in a direction away from the chamber, and a recessed section is formed around the injection port in front of the one lateral face of the panel main body.

A panel for analysis according to a second aspect of the present invention is the panel for analysis according to the first aspect of the present invention, wherein a protrusion amount of the injection port is arranged so as to be approximately equal to the one lateral face of the panel main body.

A panel for analysis according to a third aspect of the present invention is the panel for analysis according to the first aspect of the present invention, wherein the cross-sectional area of the recessed section at an opening of the recessed section is equal to or greater than the cross-sectional area of the recessed section at a far end of the recessed section.

A panel for analysis according to a fourth aspect of the present invention is the panel for analysis according to the first aspect of the present invention, wherein the injection port protrudes with the bottom face of the recessed section as the proximal end of the injection port.

A panel for analysis according to a fifth aspect of the present invention is the panel for analysis according to the first aspect of the present invention, wherein the capacity of the recessed section is sufficient to accept a sample liquid adhered in the vicinity of the injection port when a sample liquid is dispensed as a drop on the injection port.

A panel for analysis according to a sixth aspect of the present invention is the panel for analysis according to the first aspect of the present invention, wherein an absorbing member that absorbs the sample liquid is disposed at the recessed section.

A panel for analysis according to a seventh aspect of the present invention is the panel for analysis according to the sixth aspect of the present invention, wherein the absorbing member is disposed at a position at which centrifugal force generated by the rotation about the axis center causes the absorbing member to come into contact with a sample liquid transferred to the recessed section.

A panel for analysis according to an eighth aspect of the present invention is the panel for analysis according to the first aspect of the present invention, wherein a grooved section is formed which communicates with the recessed section and retains a sample liquid by capillary force.

A panel for analysis according to a ninth aspect of the present invention is the panel for analysis according to the eighth aspect of the present invention, wherein the grooved section communicates with the bottom of the recessed section.

A panel for analysis according to a tenth aspect of the present invention is the panel for analysis according to the eighth aspect of the present invention, wherein the grooved section is shaped so as to cause a sample liquid transferred to the recessed section by centrifugal force generated by the rotation about the axis center to be further transferred inward by the centrifugal force.

A panel for analysis according to an eleventh aspect of the present invention is the panel for analysis according to the first aspect of the present invention, wherein the recessed section communicates with the chamber.

A panel for analysis according to a twelfth aspect of the present invention is the panel for analysis according to the eleventh aspect of the present invention, wherein a sample liquid adhered in the vicinity of the injection port is transferred into the chamber through a channel communicatively connecting the recessed section and the chamber by centrifugal force generated by the rotation about the axis center.

A panel for analysis according to a thirteenth aspect of the present invention is the panel for analysis according to the first aspect of the present invention, wherein the panel for analysis has an analyzing reagent to be used for blood analysis as a sample liquid in the chamber that communicates with the injection port.

A panel for analysis according to a fourteenth aspect of the present invention is the panel for analysis according to the first aspect of the present invention, wherein the panel for analysis is provided with an openable and closeable cover that covers the injection port and the recessed section.

A panel for analysis according to a fifteenth aspect of the present invention is the panel for analysis according to the first aspect of the present invention, wherein the panel for analysis is provided with an openable and closeable cover that covers the injection port and the recessed section, and an absorbing member that absorbs a sample liquid is provided inside the cover.

A panel for analysis according to a sixteenth aspect of the present invention is the panel for analysis according to the first aspect of the present invention, wherein the panel for analysis is provided with an openable and closeable cover that covers the injection port and the recessed section, an absorbing member that absorbs a sample liquid is provided inside the cover, and a gap is formed between the injection port and the absorbing member.

A panel for analysis according to a seventeenth aspect of the present invention is the panel for analysis according to the first aspect of the present invention, wherein the chamber includes: a retaining chamber that temporarily retains a sample liquid dispensed as a drop on the injection port; a reagent chamber that retains an analyzing reagent necessary for analysis; and a measurement chamber region to which the sample liquid retained in the retaining chamber and the analyzing reagent are transferred, which causes the sample liquid and the analyzing reagent to be mixed, and in which a measurement of the sample liquid mixed with the analyzing reagent is performed.

A panel for analysis according to an eighteenth aspect of the present invention is the panel for analysis according to any one of the first, twelfth and fourteenth aspects of the present invention, wherein a surfactant is applied to at least any one of a surface of the peripheral section of the injection port, the recessed section, the channel communicatively connecting the recessed section and the chamber, and an inner face of the cover member.

An analyzer according to a nineteenth aspect of the present invention includes: a panel for analysis internally provided with a chamber which communicates with an injection port for a sample liquid provided on one lateral face of a panel main body and to which a sample liquid dispensed as a drop on the injection port is transferred; and a holding member for the panel for analysis on which the panel for analysis is to be mounted, the analyzer being arranged so as to transfer the sample liquid dispensed as a drop on the injection port to the chamber by centrifugal force generated by rotating the holding member for the panel for analysis and to perform analysis by optically accessing the sample liquid in the chamber and detecting a signal, wherein an openable and closeable cover that covers the injection port is provided on the panel for analysis, and the analyzer is arranged so as to perform an analysis operation by mounting the panel for analysis in a state where the cover is closed to the holding member for the panel for analysis so that the injection port traverses the rotating axis center of the holding member for the panel for analysis.

An analyzer according to a twentieth aspect of the present invention is the analyzer according to the nineteenth aspect of the present invention, wherein an absorbing member that absorbs the sample liquid is provided inside the cover.

An analyzer according to a twenty-first aspect of the present invention is the analyzer according to the nineteenth aspect of the present invention, wherein a recessed section for collecting a sample liquid droplet adhered in the vicinity of the injection port of the panel for analysis is provided inside the cover.

An analyzer according to a twenty-second aspect of the present invention is the analyzer according to the twenty-first aspect of the present invention, wherein a groove that retains a sample liquid by capillary force is formed on the recessed section.

An analyzer according to a twenty-third aspect of the present invention is the analyzer according to the nineteenth aspect of the present invention, wherein a surfactant is applied to at least any one of a surface of the peripheral section of the injection port of the panel for analysis and an inner face of the cover member.

An analyzer according to a twenty-fourth aspect of the present invention includes: the panel for analysis according to any one of the first to eighth aspects of the present invention; and a holding member for the panel for analysis on which the panel for analysis is to be mounted, the analyzer being arranged so as to transfer the sample liquid dispensed as a drop on the injection port to the chamber by centrifugal force generated by rotating the holding member for the panel for analysis and to perform analysis by optically accessing the sample liquid in the chamber and detecting a signal, wherein the analyzer is arranged so as to perform an analysis operation by mounting the panel for analysis to the holding member for the panel for analysis so that the injection port traverses either a side of the holding member for the panel for analysis which is further towards the outer periphery than the rotating axis center or the rotating axis center of the holding member for the panel for analysis.

A panel for analysis according to a twenty-fifth aspect of the present invention is a panel for analysis in which an injection port for a sample liquid is provided on one lateral face of a panel main body, a chamber communicating with the injection port and through which is transferred a sample liquid dispensed as a drop on the injection port is provided inside the panel main body, and the panel main body is rotated about an axis center to perform an analysis of components of the sample liquid at the chamber, wherein the injection port is shaped so as to protrude from the one lateral face of the panel main body in a direction away from the chamber, an openable and closeable cover that covers the injection port is provided on the panel main body, a recessed section that collects a sample liquid droplet adhered in the vicinity of the injection port or an absorbing member that absorbs the sample liquid droplet is provided inside the cover, and a gap is formed between the injection port and the recessed section or between the injection port and the absorbing member in a state where the cover is closed.

With the panel for analysis according to the present invention, an injection port provided on one lateral face of a panel main body is shaped to protrude from the one lateral face in a direction away from the chamber and a recessed section is formed around the injection port in front of the one lateral face of the panel main body, so that when the panel main body is rotated in a state where the injection port is disposed on a rotating axis center-side and an analysis of components of the sample liquid is performed at the chamber, a sample liquid adhered around the injection port is reliably transferred to and collected by the recessed section upon generation of centrifugal force. As a result, an effect is achieved in that the sample liquid injected into the chamber is prevented from being discharged in an opposite direction to the outside of the chamber.

In addition, the analyzer according to the present invention is arranged so as to: include a panel for analysis internally provided with a chamber communicating with an injection port for a sample liquid provided on one lateral face of a panel main body and to which a sample liquid dispensed as a drop on the injection port is transferred, and a holding member for the panel for analysis on which the panel for analysis is to be mounted; and transfer a sample liquid dispensed as a drop on the injection port to the chamber by centrifugal force generated by rotating the holding member for the panel for analysis, and perform analysis by optically accessing the sample liquid in the chamber and detecting a signal, wherein an openable and closeable cover that covers the injection port is provided on the panel for analysis, and the analyzer is arranged so as to perform an analysis operation by mounting the panel for analysis in a state where the cover is closed to the holding member for the panel for analysis so that the injection port traverses the rotating axis center of the holding member for the panel for analysis. As a result, the sample liquid dispensed as a drop on the injection port is transferred towards the chamber when the holding member for the panel for analysis moves and centrifugal force is generated. Furthermore, a sample liquid adhered around the injection port when dispensed as a drop moves in a direction opposite to the chamber and is reliably collected by the cover, whereby an effect is achieved in that the sample liquid is prevented from dispersing outward and causing contamination.

BEST MODE FOR CARRYING OUT THE INVENTION

Various embodiments of the present invention will now be described with reference to FIGS. 1 to 19A, 19B, and 19C.

(First Embodiment)

FIGS. 1 to 6 depict a first embodiment of the present invention.

Figure 1:
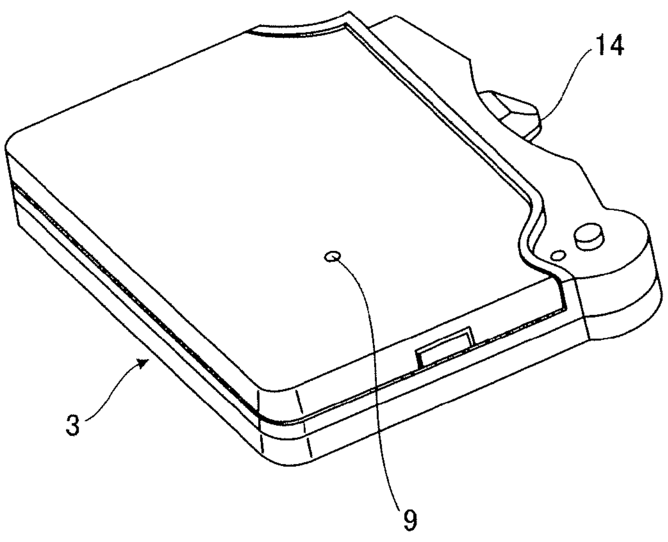
FIG. 1 is an exterior perspective view of a panel for analysis according to a first embodiment of the present invention.
Figure 2:
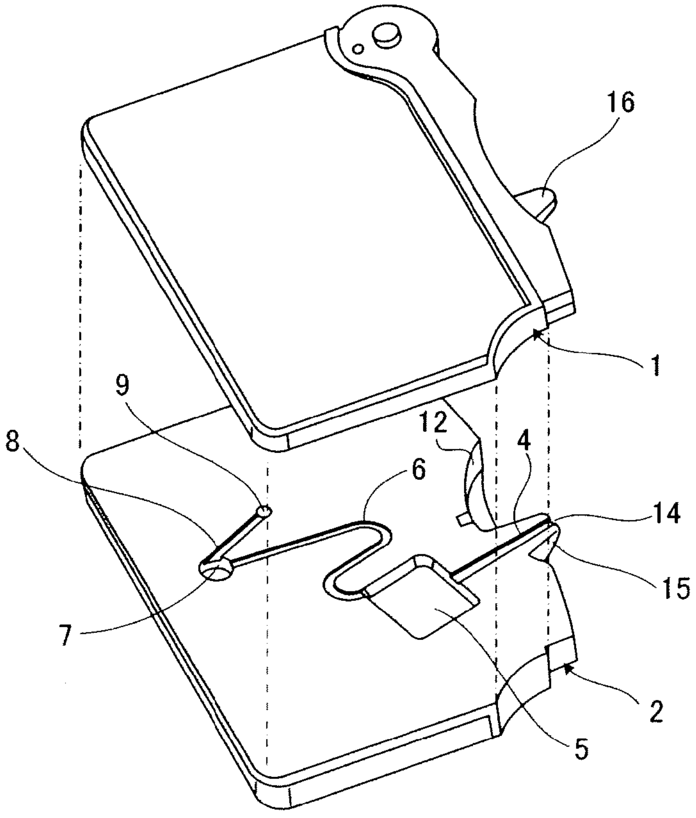
FIG. 2 is an exploded perspective view of the panel for analysis according to the first embodiment.

FIG. 1 shows a panel 3 for analysis according to the present invention and FIG. 2 is an exploded view of the same.

The panel 3 for analysis is configured as a lamination of an upper substrate 1 and a lower substrate 2. Formed on one face of the lower substrate 2 are: a single side 15 forming an injection port 14; a retaining chamber 4 that retains a sample liquid injected on the injection port 14; a reagent chamber 5 retaining an analyzing reagent (not shown); a measurement chamber region 7 to which the sample liquid retained in the retaining chamber 4 and the analyzing reagent are transferred, which mixes the sample liquid with the analyzing reagent, and at which a measurement of the sample liquid mixed with the analyzing reagent is performed; a flow channel 6 that communicatively connects the reagent chamber 5 and the measurement chamber region 7; and a flow channel 8 that communicatively connects the measurement chamber region 7 to an aerial open hole 9.

In the present embodiment, while a chamber that causes a mixture of a sample liquid and an analyzing reagent and a chamber in which is performed a measurement of the sample liquid mixed with the analyzing reagent are configured as an integrated measurement chamber region 7, the chamber that causes a mixture of the sample liquid and the analyzing reagent and the chamber in which is performed a measurement of the sample liquid mixed with the analyzing reagent may be formed separately.

The upper substrate 1 is laminated to the lower substrate 2 and the various aperture planes of the retaining chamber 4, the reagent chamber 5, the measurement chamber region 7, the flow channel 6 and the flow channel 8 are blocked to form a cavity having a gap of a predetermined size, causing respective functions including transferring the sample liquid by capillary force and retaining a predetermined liquid volume to be performed. The injection port 14 is formed by the junction of the single side 15 of the lower substrate 2 and a single side 16 of the upper substrate 1.

Figure 3:
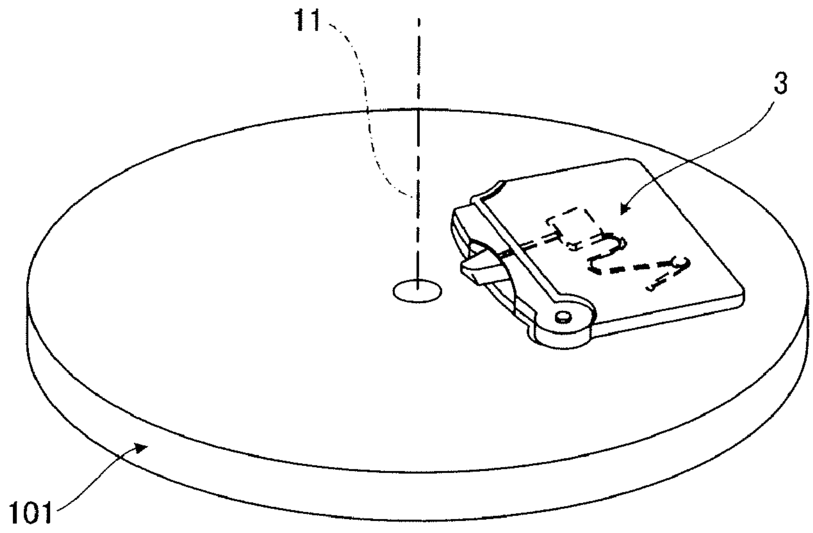
FIG. 3 is a perspective view of a state where the panel for analysis is mounted to a holding member of the panel for analysis in an analyzer.

FIG. 3 shows a state where the panel 3 for analysis is mounted to a holding member 101 for the panel for analysis in an analyzer. The analyzer optically analyzes characteristics of the sample liquid while having a rotary drive unit rotate the disk-shaped holding member 101 for the panel for analysis about an axis center 11.

Figure 4:
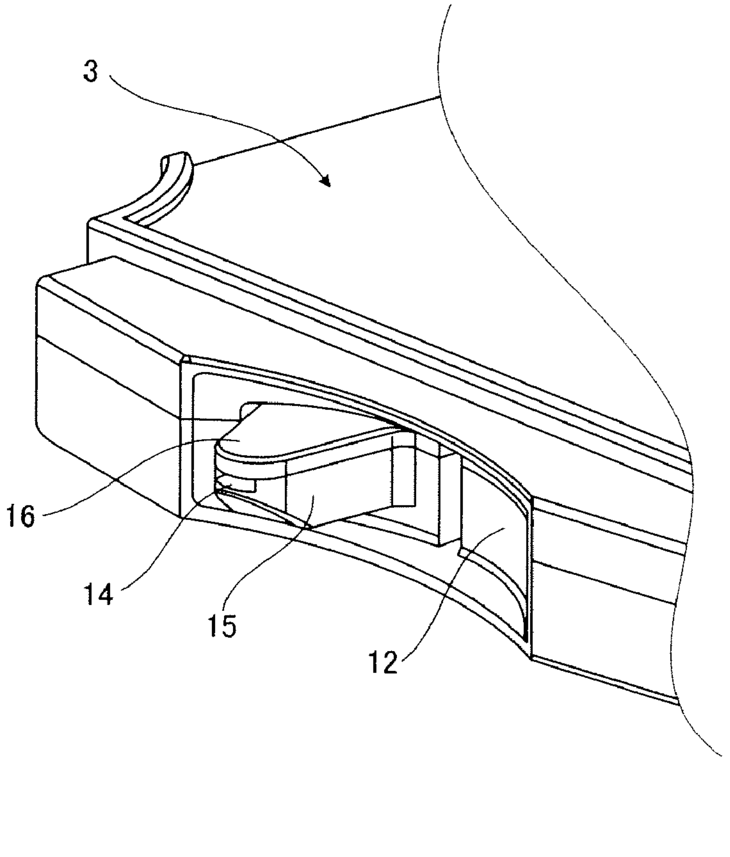
FIG. 4 is an enlarged perspective view of the periphery of an injection port of the panel for analysis according to the first embodiment.

As shown in FIG. 4, the injection port 14 of the panel 3 for analysis is formed so as to protrude in a direction away from the retaining chamber 4. In other words, the injection port 14 of the panel 3 for analysis in a state where the panel 3 for analysis is set on the holding member 101 for the panel for analysis is formed in a shape to protrude from one lateral face of a main body of the panel 3 for analysis in a direction approaching the axis center 11, enabling the sample liquid to be easily supplied. More specifically, when collecting and setting human blood as a sample liquid, a puncture needle such as a lancet that is a blood drawing puncture aid is pressed against a region such as a fingertip from which blood is to be drawn to puncture the region. By bringing the injection port 14 into contact with the region from which blood is to be drawn, the sample liquid is injected into the retaining chamber 4 by capillary force or the like to readily supply the sample liquid and to prevent blood from adhering to places other than the injection port 14 when blood is being dispensed as a drop.

Figure 5:
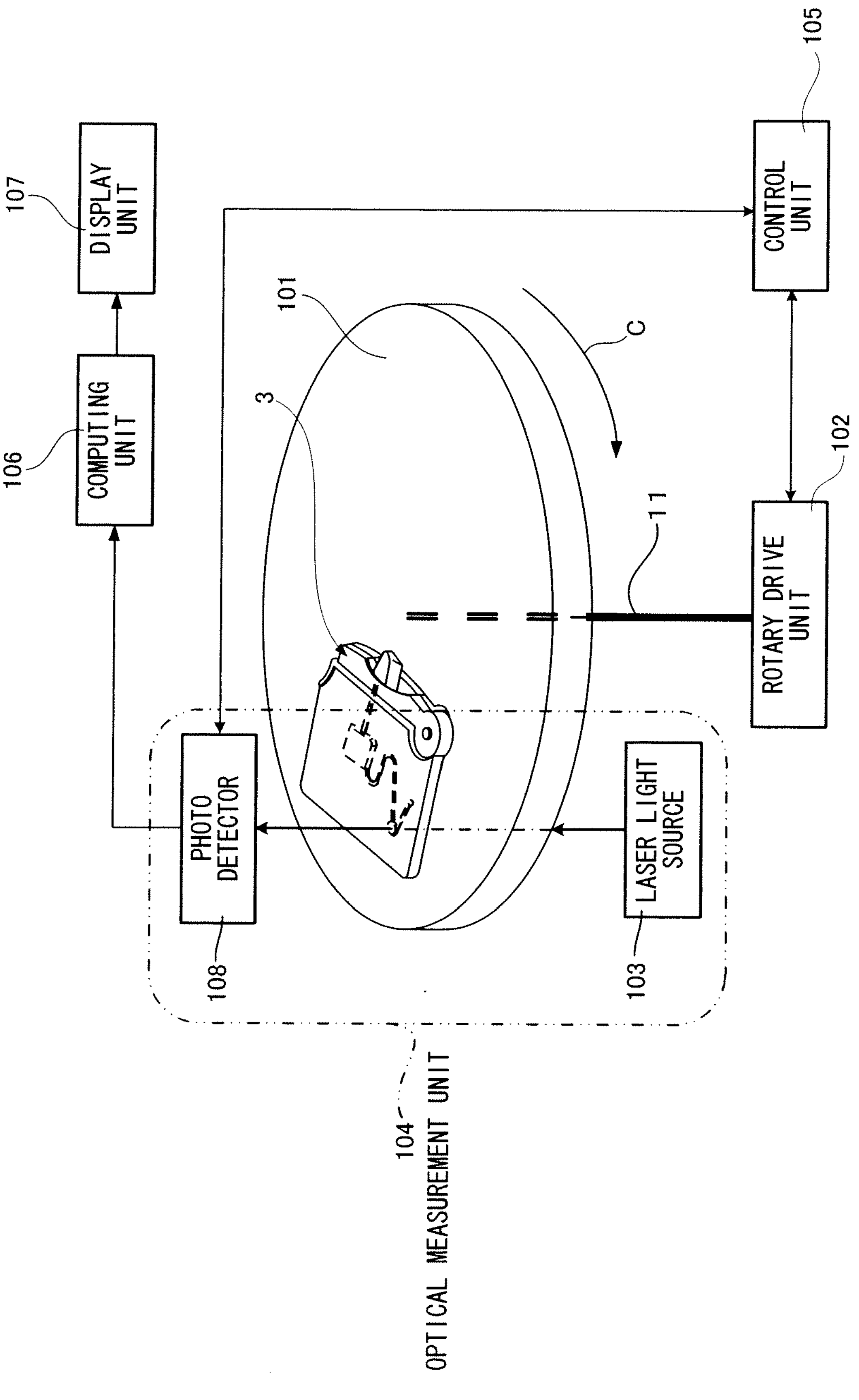
FIG. 5 is a configuration diagram of an analyzer according to the first embodiment.

FIG. 5 shows the configuration of the analyzer.

The present analyzer includes: the holding member 101 for the panel for analysis to which the panel 3 for analysis is mounted; a motor 102 as a rotary drive unit that rotationally drives the holding member 101 for the panel for analysis about the axis center 11; an optical measurement unit 104 for optically measuring a solution in the panel 3 for analysis; a control unit 105 that controls a rotational speed or a rotational direction of the holding member 101 for the panel for analysis, the measurement timing of the optical measurement unit 104, and the like; a computing unit 106 that processes a signal obtained by the optical measurement unit 104 and computes, in addition to a concentration or a volume of a particular substance in blood when the sample liquid is blood, a shape, a size or the like of the substance depending on an objective of the analysis; and a display unit 107 for displaying a result obtained by the computing unit 106.

The optical measurement unit 104 is provided with a laser light source 103 for irradiating a measurement unit of the panel 3 for analysis with laser light and a photo detector 108 that detects a light amount of transmitted light passing through the analyzing device 1 among laser light emitted from the laser light source 103. The optical measurement unit 104 can be provided with a laser light source 103 and a photo detector 108 that are appropriate for a wavelength type required for the measurement.

Depending upon usage, by the configuration of the chambers and flow channels within the panel 3 for analysis, the analyzer can also become a centrifuge that transfers and centrifugally separates a liquid in the panel using centrifugal force generated by rotation about the axis center. The panel for analysis may take a fan-like shape, a cubical shape or any other shape. In addition, the plurality of panels 3 for analysis may be simultaneously mounted to the holding member 101 for the panel for analysis.

As is shown in FIG. 4 which presents an enlarged view of the periphery of the injection port 14, a recessed section 12 which is opened only on the side of the axis center 11 and which is depressed further towards the outer periphery than the axis center 11 is formed around the injection port 14 on one lateral face of the panel 3 for analysis. The recessed section 12 is formed having a gradually curved shape so that the cross-sectional area of the recessed section 12 at an opening on the side of the axis center 11 is equal to or greater than the cross-sectional area of the recessed section at an outer peripheral-side opening. Therefore, when centrifugal force is generated in the state shown in FIG. 3, a sample liquid adhered around the injection port 14 is reliably transferred to the recessed section 12, further is more easily transferred to the lowest position in the recessed section 12, and can be collected without dispersing outward from the recessed section 12.

In addition, by forming the injection port 14 in a protrusion shape by the single sides 15 and 16 so that the injection port 14 protrudes in a direction from the bottom face of the opened recessed section 12 and approaching the axis center 11, a sample liquid adhered around the injection port 14 is transferred into the recessed section 12. Since the position to which the sample liquid is transferred is roughly the bottom face in the recessed section 12, the sample liquid can be stably collected without spilling outward from the recessed section 12. In addition, an effect can be achieved in that such collection can be performed with the single recessed section 12.

In other words, centrifugal force generated by rotation about the axis center causes the sample liquid adhered in the vicinity of the injection port 14 to travel along a surface of a protruding section forming the injection port 14 to be transferred into the recessed section 12. In addition, while the sample liquid adhered in the vicinity of the injection port 14 is transferred into the recessed section 12, the sample liquid inside the retaining chamber 4 is transferred by centrifugal force into the reagent chamber 5 in which an analyzing reagent is held in advance. The sample liquid having flowed into the reagent chamber 5 is mixed with the analyzing reagent held inside the reagent chamber 5 by a swinging motion caused by a rotational acceleration of the holding member 101 for the panel for analysis or by liquid diffusion during suspension of rotation. The mixing can also be performed by applying an external force that directly vibrates the reagent chamber 5 itself.

When the mixture of the analyzing reagent and the sample liquid reaches a predetermined level, the sample liquid in the reagent chamber 5 is transferred through the flow channel 6 by capillary force to an entrance of the measurement chamber region 7. As laser light emitted by the laser light source 103 passes through the measurement chamber region 7, the concentration of components of the sample liquid can be measured by absorbance determination of the reactive state of the sample liquid and the analyzing reagent performed by the photo detector 108.

By arranging the recessed section 12 so as to have a capacity sufficient for accepting a sample liquid adhered in the vicinity of the injection port 14 when the sample liquid is dispensed as a drop on the injection port 14, an effect is achieved in that the sample liquid is prevented from being transferred in such a volume that the sample liquid flows outwards from the recessed section 12. Assuming that blood is to be applied as the sample liquid, when blood is to be dispensed as a drop by blood drawing from a fingertip using a puncture device such as a lancet, it is presumed that the volume of the sample liquid is to be around 10 μl and that it is common practice to inject a blood drawing amount not exceeding the drop-dispensing amount through the injection port 14. Thus, the maximum capacity of the recessed section 12 is set to 10 μl.

Figure 6:
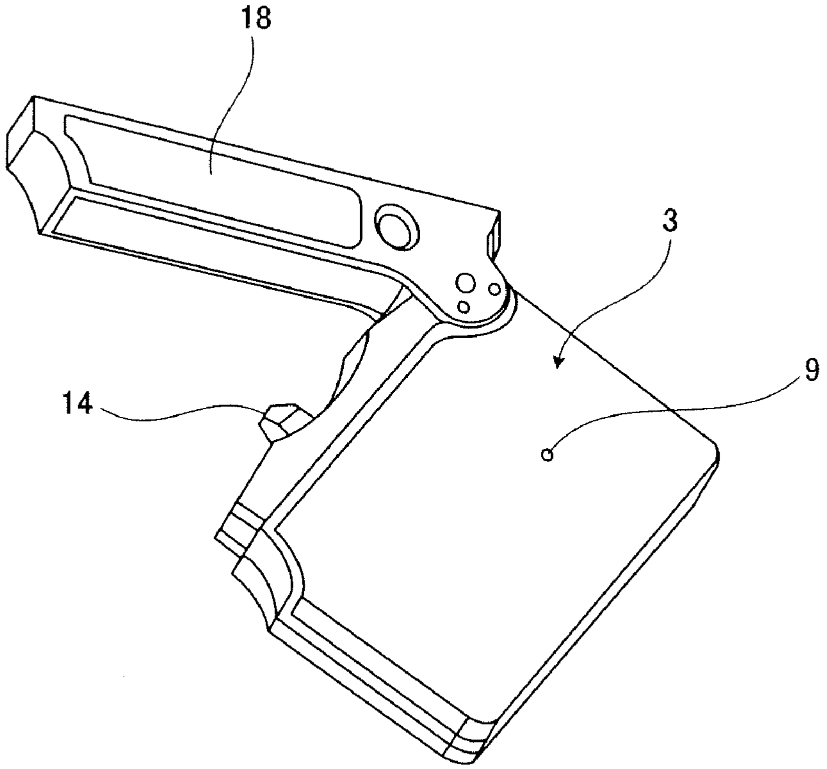
FIG. 6 is an exterior perspective view showing an example in which an openable and closeable cover is mounted on the panel for analysis.

Furthermore, as shown in FIG. 6, by providing the panel 3 for analysis with an openable and closeable cover 18 that covers the injection port 14 and the recessed section 12, an effect as described below can be further achieved.

By opening the cover 18, dispensing a sample liquid as a drop on the injection port 14, and subsequently mounting the panel 3 for analysis to the holding member 101 for the panel for analysis in a state where the cover 18 is closed, even when for some reason the sample liquid transferred to the recessed section 12 or into the chamber 4 flows outwards to a lateral face of the panel 3 for analysis near the injection port 14 and the recessed section 12, the cover 18 can catch the sample liquid to avoid situations where the sample liquid flows outwards. In addition, after analysis, by throwing away the panel for analysis as-is without opening the cover 18, occurrences of contamination can be prevented. Thus, the cover 18 is suitable for a disposable panel for analysis.

Furthermore, when a surfactant is applied to a surface of the periphery of the injection port 14, a sample liquid can be transferred to the recessed section 12 in a smooth manner by the centrifugal force due to hydrophilic processing of the surfactant at the surface of the periphery of the injection port 14 during the transfer.

As described above, since the recessed section 12 is formed around the injection port 14, analysis can be performed without contamination caused by dispersal of a sample liquid adhered in the vicinity of the injection port 14, and an effect can be achieved in that the sample liquid injected into the chamber 4 can be prevented from being discharged in an opposite direction to the outside.

(Second Embodiment)

Figure 7:
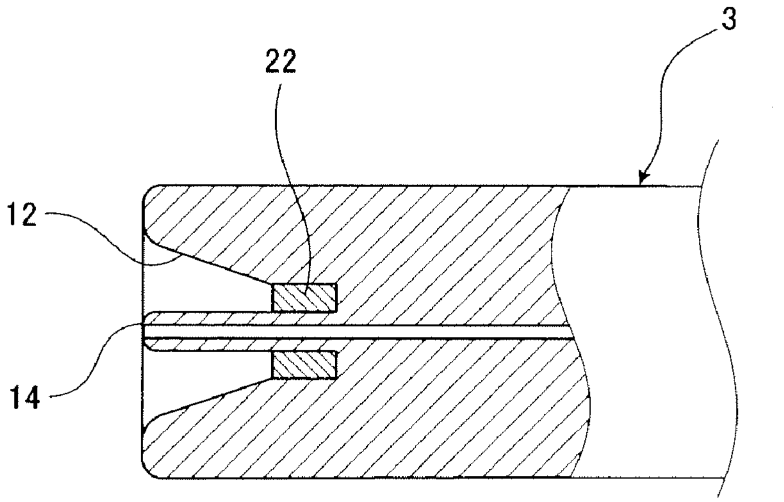
FIG. 7 is an enlarged cross-sectional view of the periphery of an injection port of a panel for analysis according to a second embodiment of the present invention.
Figure 8A:
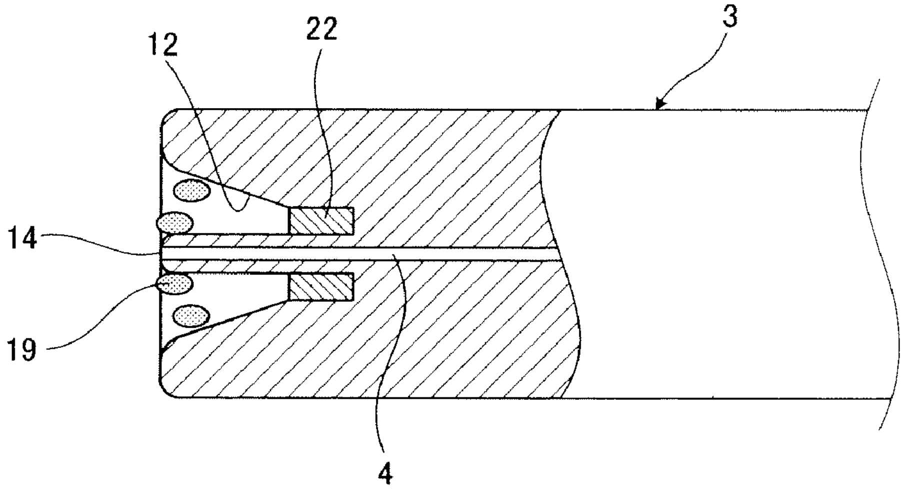
FIG. 8A is an explanatory diagram of a transfer process of a sample liquid droplet according to the second embodiment.
Figure 8B:
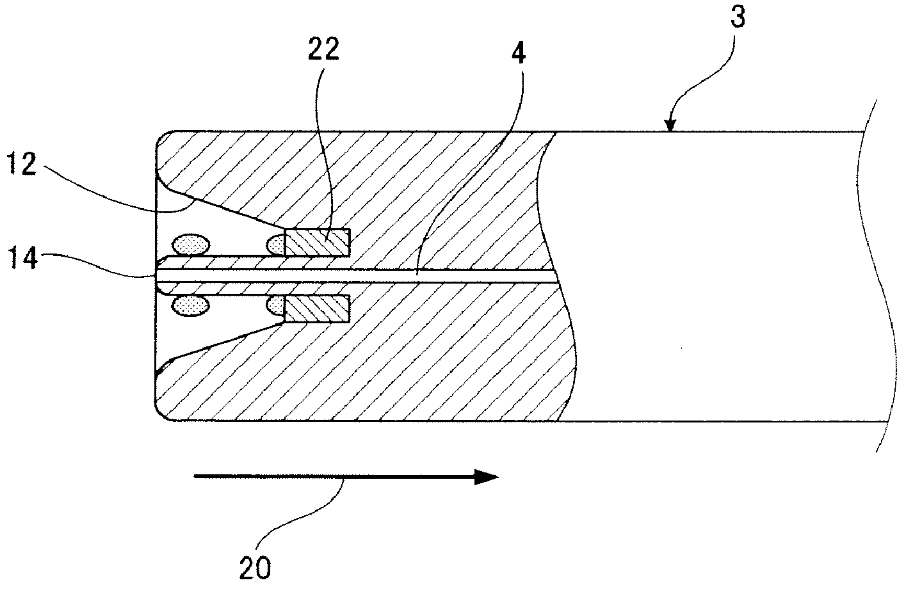
FIG. 8B is an explanatory diagram of a transfer process of a sample liquid droplet according to the second embodiment.

FIGS. 7, 8A and 8B depict a second embodiment of the present invention.

Since the primary configuration of a panel 3 for analysis, a holding member 101 for the panel for analysis to which the panel 3 for analysis is to be mounted, and a measurement method of a reactive state of a sample liquid and an analyzing reagent are the same as the contents described in the first embodiment, descriptions thereof will be omitted herein.

FIG. 7 shows the configuration of the vicinity of an injection port 14 of the panel 3 for analysis according to the second embodiment.

A tip of the injection port 14 is at a position virtually equivalent to one lateral face of a main body of the panel 3 for analysis. A recessed section 12 which is opened only on a face on the side of an axis center 11 and which is depressed further towards the outer periphery than the axis center 11 is formed around the injection port 14. The recessed section 12 is further formed so that the cross-sectional area of the recessed section 12 at an opening on the side of the axis center 11 is equal to or greater than the cross-sectional area of the recessed section 12 at an outer peripheral-side opening. In addition, the injection port 14 is formed so as to protrude from the bottom face of the recessed section 12. The recessed section 12 is arranged so as to have a capacity sufficient for accepting a sample liquid droplet adhered in the vicinity of the injection port 14 when the sample liquid is dispensed as a drop on the injection port 14. The amount of blood to be dispensed as a drop by a single blood drawing operation from a fingertip using a puncture device such as a lancet is, at a maximum, around 10 μl. Thus, it is common practice to inject an amount of blood drawn not exceeding the drop-dispensing amount through the injection port 14. In consideration thereof, in the present invention, the maximum capacity of the recessed section 12 is set to 10 μl.

Furthermore, the recessed section 12 is provided with an absorbing member 22 as a material for absorbing a sample liquid which is a nonwoven fabric or the like made of, for example, polypropylene or a paper material.

With such a configuration, in a state where a sample liquid is dispensed as a drop on the injection port 14, a sample liquid droplet 19 is adhered in the vicinity of the injection port 14 as shown in FIG. 8A. The panel 3 for analysis to which the sample liquid droplet 19 adheres is mounted as-is to the holding member 101 for the panel for analysis. Centrifugal force generated by rotating the panel 3 for analysis about the axis center 11 causes the sample liquid droplet adhered near the injection port 14 to be moved inside the recessed section 12 in the direction indicated by an arrow 20 and transferred to the absorbing member 22, where the sample liquid droplet is ultimately absorbed by the absorbing member 22 as shown in FIG. 8B.

By utilizing, without modification, an action of a predetermined centrifugal force to be used for transferring the sample liquid inside the panel main body in a state where the absorbing member 22 that absorbs the sample liquid is mounted, the sample liquid adhered in the vicinity of the injection port can be transferred to the recessed section 12 and the absorbing member 22 provided further towards the outer periphery than the injection port is capable of absorbing and collecting the transferred sample liquid adhered in the vicinity of the injection port. Consequently, an effect is achieved in that collection of the sample liquid can be performed more effectively in comparison to a case where the absorbing member 22 is not provided.

After injecting a predetermined amount of a sample liquid into the panel 3 for analysis, the panel 3 for analysis is mounted to the holding member 101 for the panel for analysis. Although the number of revolutions necessary for transferring the sample liquid droplet is 1000 rpm or more, when hydrophilic processing using a surfactant or the like is performed on the entire inner periphery of the recessed section 12 and on the vicinity of the injection port 14, it is possible to transfer the sample liquid droplet by applying a centrifugal force generated by a rotation of only several hundred rpm.

In addition, the absorbing member 22 may be fixed to the bottom face of the recessed section 12 or provided between the injection port 14 and the bottom face of the recessed section 12.

Furthermore, providing the absorbing member 22 achieves an effect that the sample liquid droplet 19 temporarily retained by the absorbing member 22 can be prevented from leaking out of the absorbing member 22 even when the absorbing member 22 is tilted after completion of analysis in a direction in which gravitational force acts.

Moreover, in the same manner as in the first embodiment, by providing the cover 18 on the panel 3 for analysis, opening the cover 18 and dispensing the sample liquid as a drop on the injection port 14, and subsequently mounting the panel 3 for analysis to the holding member 101 for the panel for analysis in a state where the cover 18 is closed, reliability with respect to preventing spilling of the sample liquid is further enhanced.

(Third Embodiment)

FIGS. 9, 10A, 10B, and 10C depict a third embodiment of the present invention.

In the second embodiment, the absorbing member 22 is provided either on the bottom face in the recessed section 12 or between the injection port 14 and the bottom face in the recessed section 12. However, the third embodiment differs from the second embodiment in that the third embodiment is provided with a grooved section 17 communicating with a recessed section 12 and is configured so as to retain a sample liquid droplet 19 by capillary force. Otherwise, the third embodiment is the same as the second embodiment.

Figure 9:
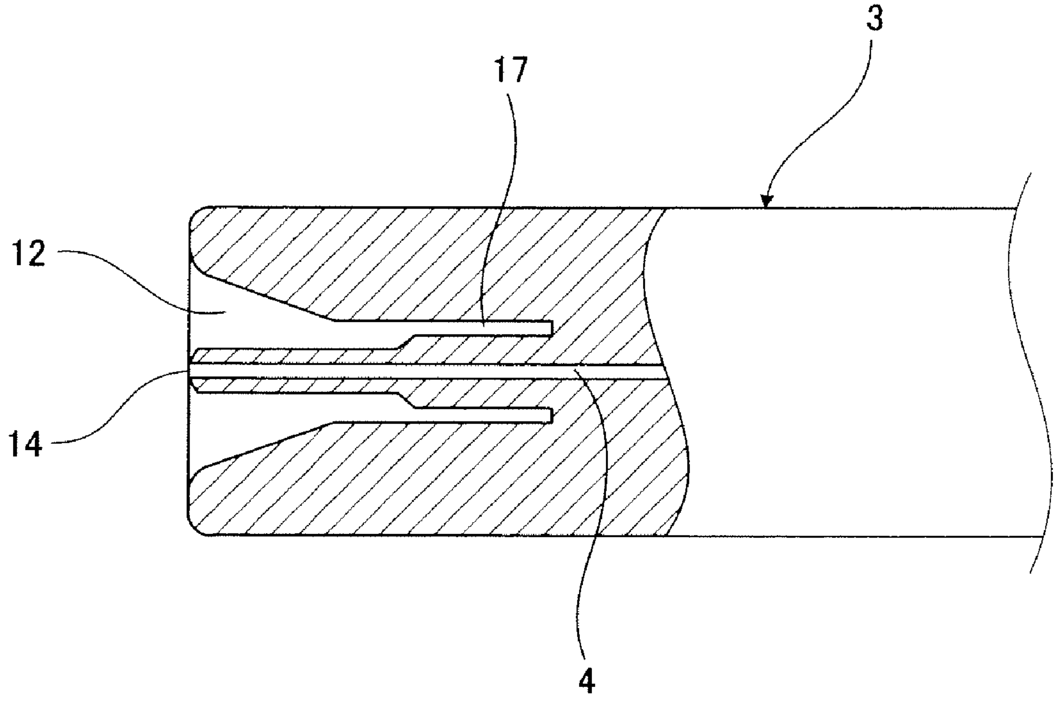
FIG. 9 is an enlarged cross-sectional view of the periphery of an injection port of a panel for analysis according to a third embodiment of the present invention.

FIG. 9 shows the vicinity of an injection port 14 of a panel 3 for analysis according to the third embodiment.

A tip of the injection port 14 is at a position virtually equivalent to one lateral face of a main body of the panel 3 for analysis. The recessed section 12 that is opened only on a face on the side of an axis center 11 and which is further depressed towards the outer periphery than the axis center 11 is formed around the injection port 14. The recessed section 12 is further formed so that the cross-sectional area of the recessed section at an opening on the side the axis center 11 is equal to or greater than the cross-sectional area of the recessed section 12 at an outer peripheral-side opening. In addition, the injection port 14 is formed so as to protrude from the bottom face of the recessed section 12. The recessed section 12 is arranged so as to have a capacity sufficient for accepting a sample liquid droplet adhered in the vicinity of the injection port when the sample liquid is dispensed as a drop on the injection port 14. At least the one grooved section 17 communicating with the recessed section 12 is formed on the bottom face of the recessed section 12.

Figure 10A:
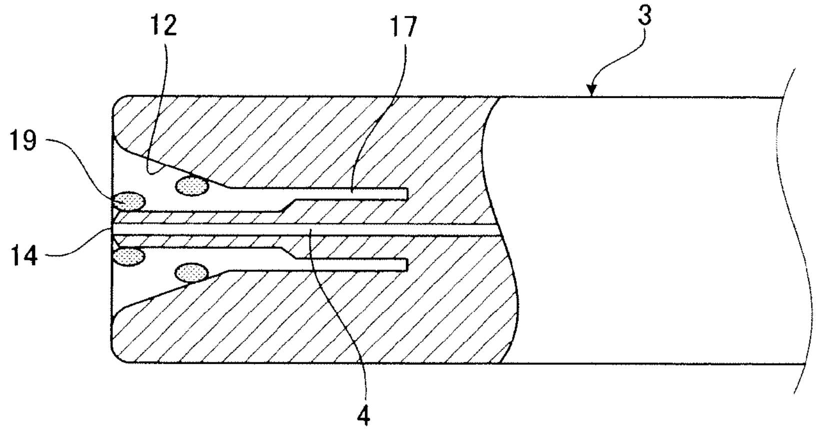
FIG. 10A is an explanatory diagram of a transfer process of a sample liquid droplet according to the third embodiment.
Figure 10B:
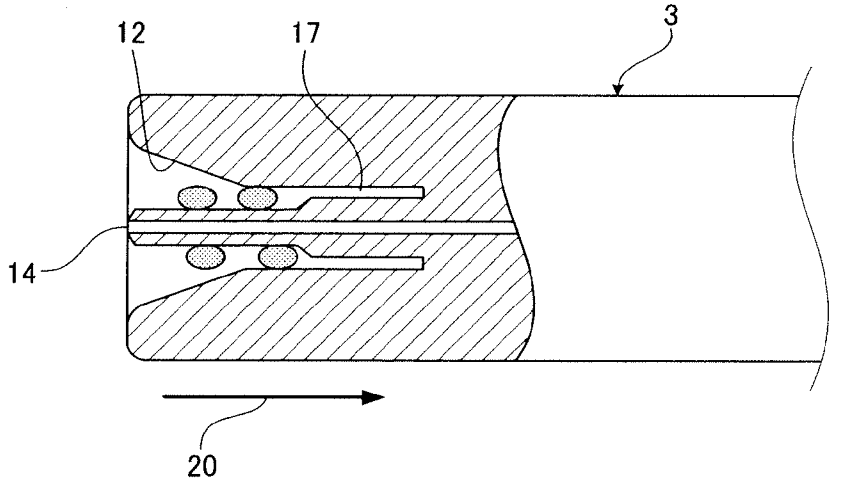
FIG. 10B is an explanatory diagram of a transfer process of a sample liquid droplet according to the third embodiment.
Figure 10C:
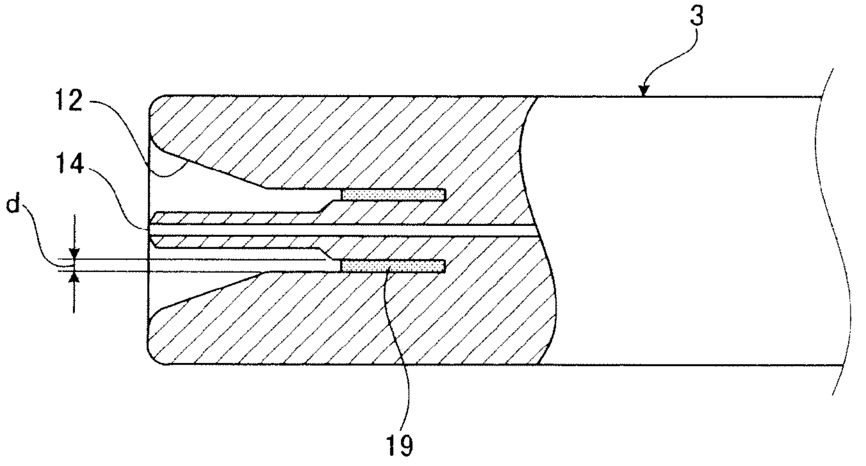
FIG. 10C is an explanatory diagram of a transfer process of a sample liquid droplet according to the third embodiment.

With such a configuration, in a state where a sample liquid is dispensed as a drop on the injection port 14, the sample liquid droplet 19 is adhered in the vicinity of the injection port 14 as shown in FIG. 10A. The panel 3 for analysis to which the sample liquid droplet 19 is adhered is mounted as-is to a holding member 101 for the panel for analysis. Centrifugal force generated by rotating the panel 3 for analysis about the axis center 11 causes the sample liquid droplet adhered near the injection port 14 to be moved inside the recessed section 12 in the direction indicated by an arrow 20 as shown in FIG. 10B and transferred to a position just before the grooved section 17 in the recessed section 12, and ultimately transferred into the grooved section 17 as shown in FIG. 10C to be collected.

In other words, by providing the grooved section 17 continuously with the recessed section 12, the sample liquid droplet 19 transferred to the recessed section 12 is further transferred into the grooved section 17 by centrifugal force and retained inside the grooved section 17 by capillary force. Since the sample liquid droplet 19 is retained by capillary force, an effect is achieved in that the sample liquid can be prevented from spilling outwards even in a state where centrifugal force is subsequently absent.

As described above, since the sample liquid droplet 19 can be reliably collected in the grooved section 17 and the sample liquid can be prevented from dispersing outwards from the panel 3 for analysis by utilizing, without modification, the action of a predetermined centrifugal force to be used for transferring the sample liquid, an analysis can be performed without any contamination.

In addition, by forming the grooved section 17 on the bottom of an outermost peripheral side of a sample acceptor that is the recessed section 12, an effect can be achieved in that the sample liquid droplet 19 transferred to the recessed section 12 can be entirely collected at a position further distanced from the injection port 14.

Furthermore, while the cross-sectional shape of the grooved section 17 according to the third embodiment is arranged as a rectangular shape, other cross-sectional shapes including circular, triangular, polygonal and the like may also suffice. In any case, an opening 21 of the grooved section 17 on the side of the axis center 11 is formed so as to have a thickness "d" of 1 mm or less in order to prevent the sample liquid inside the grooved section 17 from dropping even if the panel 3 for analysis is removed from the holding member 101 for the panel for analysis and tilted in the direction of gravitational force after completion of analysis.

Moreover, in the same manner as in the first embodiment, by providing a cover 18 on the panel 3 for analysis, opening the cover 18 and dispensing the sample liquid as a drop on the injection port 14, and subsequently mounting the panel 3 for analysis to the holding member 101 for the panel for analysis in a state where the cover 18 is closed, reliability with respect to preventing spilling of the sample liquid is further enhanced. In other words, even when for some reason the sample liquid transferred to the recessed section 12 or into a chamber flows outwards to a lateral face of the panel 3 for analysis from the injection port 14 or the recessed section 12, the cover 18 can catch the sample liquid to avoid situations where the sample liquid flows outwards. In addition, after analysis, by throwing away the panel for analysis as-is without opening the cover 18, contamination can be prevented. Thus, the cover 18 is suitable for a disposable panel for analysis.

(Fourth Embodiment)

FIGS. 11, 12A, 12B, and 12C depict a fourth embodiment of the present invention.

While ends of the grooved section 17 are blocked in the third embodiment, the fourth embodiment differs from the third embodiment only in that a grooved section 17 as a channel communicates with a reagent chamber 5. Otherwise, the fourth embodiment is the same as the third embodiment.

Figure 11:
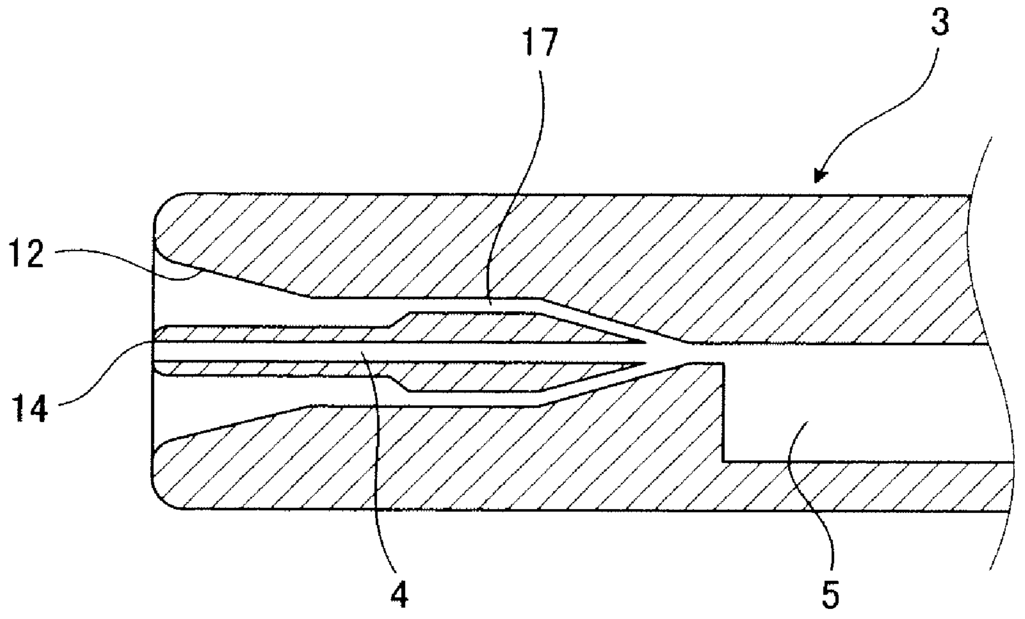
FIG. 11 is an enlarged cross-sectional view of the periphery of an injection port of a panel for analysis according to a fourth embodiment of the present invention.

FIG. 11 shows the vicinity of an injection port 14 of a panel 3 for analysis according to the fourth embodiment.

A tip of the injection port 14 communicating with the reagent chamber 5 via a retaining chamber 4 is at a position virtually equivalent to one lateral face of a main body of the panel 3 for analysis. A recessed section 12 that is opened only on a face on the side of an axis center 11 and which is depressed further towards the outer periphery than the axis center 11 is formed around the injection port 14. The recessed section 12 is further formed so that the cross-sectional area of the recessed section 12 at an opening on the side the axis center 11 is equal to or greater than the cross-sectional area of the recessed section 12 at an outer peripheral-side opening.

In addition, the injection port 14 is formed so as to protrude from the bottom face of the recessed section 12. The recessed section 12 is arranged so as to have a capacity sufficient for accepting a sample liquid droplet adhered in the vicinity of the injection port 14 when the sample liquid is dispensed as a drop on the injection port 14.

Furthermore, the bottom face of the recessed section 12 is communicated with the reagent chamber 5. More specifically, at least the one grooved section 17 whose one end is communicated with the recessed section 12 is formed on the bottom face of the recessed section 12. The other end (the end in an outer peripheral direction) of the grooved section 17 is communicated with the reagent chamber 5.

In the fourth embodiment, the other ends of the respective grooved sections 17 are communicated with each other on an outer peripheral side of the injection port 14 and then communicated with the reagent chamber 5. However, the respective grooved sections 17 may be instead communicated independently with the reagent chamber 5.

Figure 12A:
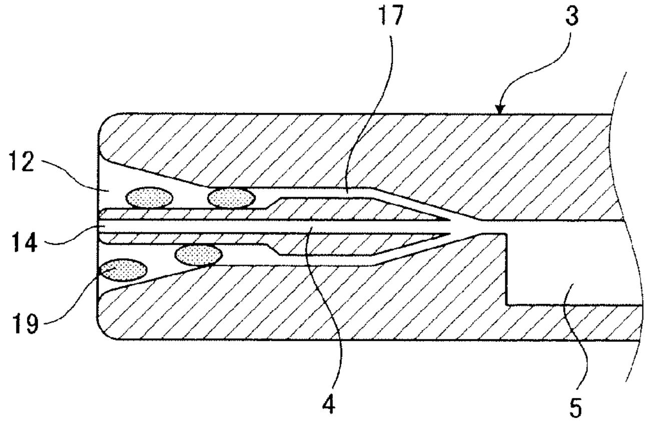
FIG. 12A is an explanatory diagram of a transfer process of a sample liquid droplet according to the fourth embodiment.
Figure 12B:
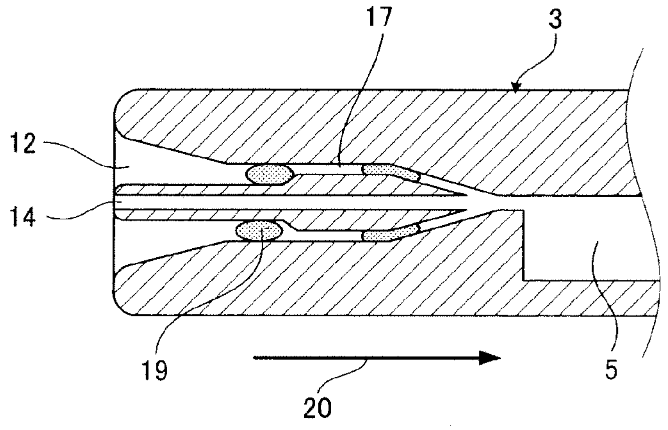
FIG. 12B is an explanatory diagram of a transfer process of a sample liquid droplet according to the fourth embodiment.
Figure 12C:
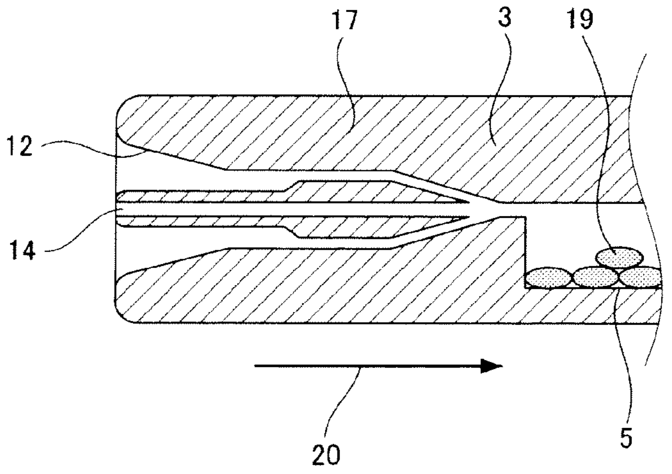
FIG. 12C is an explanatory diagram of a transfer process of a sample liquid droplet according to the fourth embodiment.

With such a configuration, in a state where a sample liquid is dispensed as a drop on the injection port 14, a sample liquid droplet 19 is adhered in the vicinity of the injection port 14 as shown in FIG. 12A. The panel 3 for analysis to which the sample liquid droplet 19 adheres is mounted as-is to a holding member 101 for the panel for analysis. Centrifugal force generated by rotating the panel 3 for analysis about the axis center 11 causes the sample liquid droplet adhered near the injection port 14 to be moved inside the recessed section 12 in the direction indicated by an arrow 20 as shown in FIG. 12B and transferred to a position just before the grooved section 17 in the recessed section 12, and ultimately transferred into the reagent chamber 5 as shown in FIG. 12C to be collected.

In other words, by providing the grooved section 17 continuously with the recessed section 12, the sample liquid droplet 19 transferred to the recessed section 12 is further transferred into the grooved section 17 by centrifugal force and retained inside the grooved section 17 by capillary force, and the sample liquid is retained inside the reagent chamber 5 by centrifugal force. As a result, an effect is achieved in that the sample liquid can be prevented from spilling outside even in a state where centrifugal force is subsequently absent.

As described above, since the sample liquid droplet 19 adhered in the vicinity of the injection port 14 can be reliably collected in the reagent chamber 5 by utilizing, without modification, the action of a predetermined centrifugal force to be used for transferring the sample liquid, the sample liquid can be prevented from dispersing outwards and causing contamination. Consequently, analysis can be safely performed on components of the sample liquid. Furthermore, an effect can be achieved in that instead of wasting the sample liquid adhered around the injection port 14, the sample liquid can be efficiently utilized as a sample liquid for analysis. In consideration of recent demands from the market for reducing the amount of a sample liquid during a sample analysis, such an efficient utilization has substantial merit in that the sample liquid that is likely to run out can be replenished by the same sample liquid.

In addition, by forming the grooved section 17 between the recessed section 12 and the reagent chamber 5, an effect can be achieved in that the sample liquid transferred to the recessed section 12 can be entirely collected in the grooved section 17 at a position further distanced from the injection port 14.

Furthermore, while the cross-sectional shape of the grooved section 17 according to the fourth embodiment is arranged as a rectangular shape, other cross-sectional shapes including circular, triangular, polygonal and the like may also suffice. In any case, an opening 21 of the grooved section 17 on the side of the axis center 11 is formed so as to have a thickness "d" of 1 mm or less in order to prevent the sample liquid inside the grooved section 17 from dropping even if the panel 3 for analysis is removed from the holding member 101 for the panel for analysis and tilted in the direction of gravitational force after completion of analysis.

Moreover, in the same manner as in the first embodiment, by providing the cover 18 on the panel 3 for analysis, opening the cover 18 and dispensing the sample liquid as a drop on the injection port 14, and subsequently mounting the panel 3 for analysis to the holding member 101 for the panel for analysis in a state where the cover 18 is closed, reliability with respect to preventing spilling of the sample liquid is further enhanced. In other words, even when for some reason the sample liquid transferred to the recessed section 12 or into the chamber flows outwards to a lateral face of the panel 3 for analysis from the injection port 14 or the recessed section 12, the cover 18 can catch the sample liquid to avoid situations where the sample liquid flows outwards. In addition, after analysis, by throwing away the panel for analysis as-is without opening the cover 18, contamination can be prevented. Thus, the cover 18 is suitable for a disposable panel for analysis.

(Fifth Embodiment)

Figure 13:
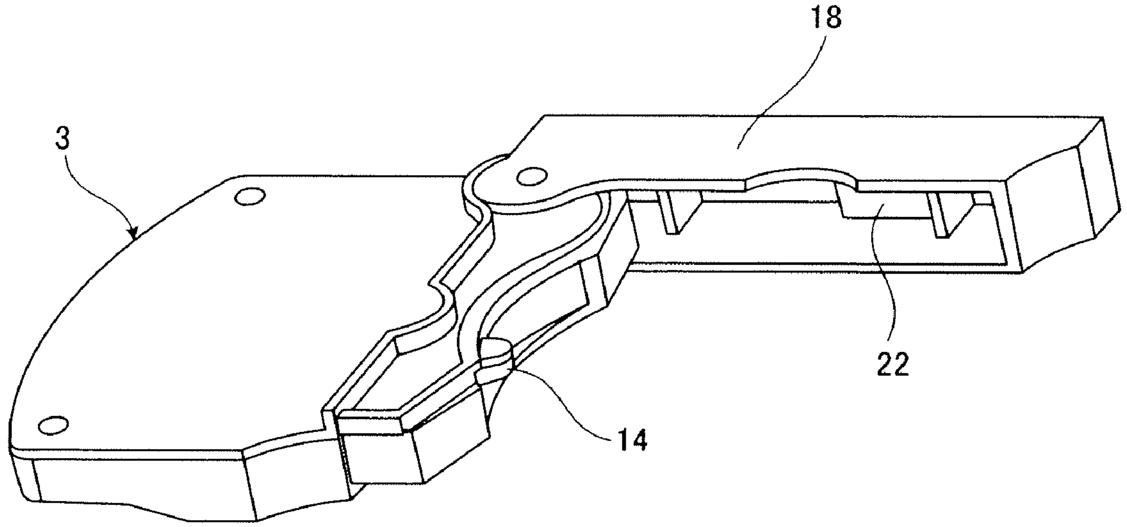
FIG. 13 is an exterior perspective view of a panel for analysis according to a fifth embodiment of the present invention.
Figure 14:
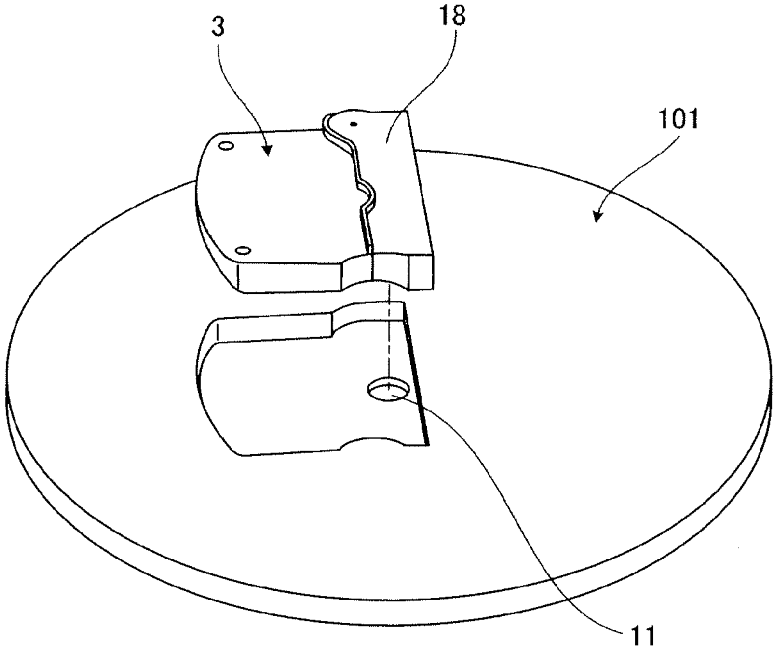
FIG. 14 is a perspective view showing a mounting position of the panel for analysis on an analyzer according to the fifth embodiment.
Figure 15:
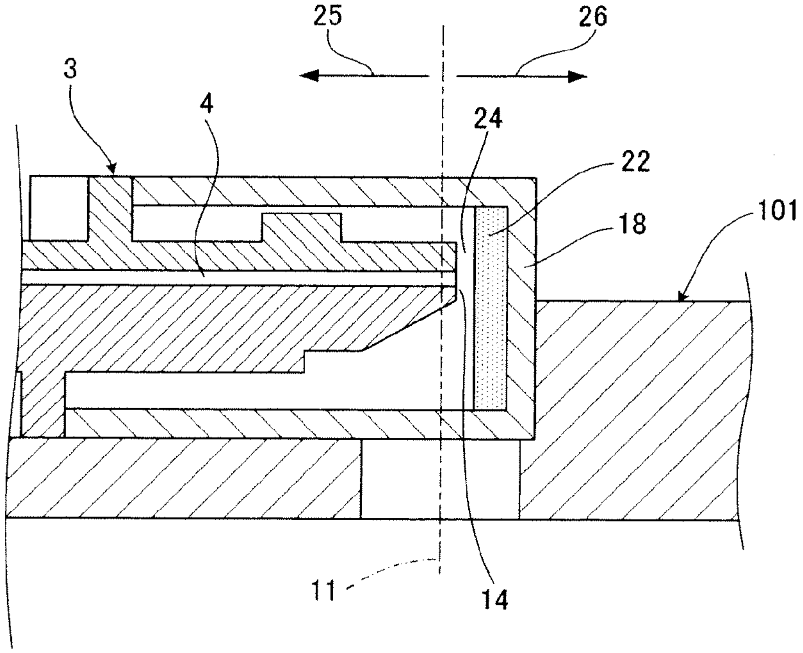
FIG. 15 is a cross sectional-diagram of the periphery of an injection port in a state where the panel for analysis is mounted on an analyzer.
Figure 16:
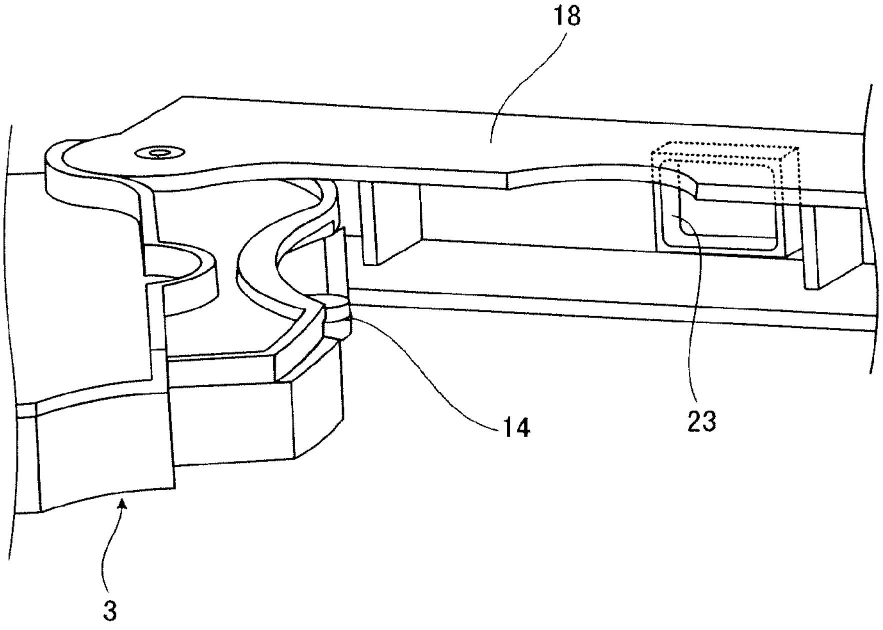
FIG. 16 is an exterior perspective view of a state where a cover of a panel for analysis is opened, according to a sixth embodiment of the present invention.

FIGS. 13 to 15 depict a fifth embodiment of the present invention.

With respect to a setting state of the panel 3 for analysis to the holding member 101 for the panel for analysis, in the respective embodiments described above, the entire panel 3 for analysis is disposed further towards the outer periphery than the axis center 11 of the holding member 101 for the panel for analysis. However, in the fifth embodiment, as shown in FIG. 15, a part of the panel 3 for analysis protrudes across the axis center 11 of the holding member 101 for the panel for analysis and to the opposite side.

As shown in FIG. 13, the present embodiment adopts a panel 3 for analysis attached with the cover 18 among the panels 3 for analysis according to any one of the first to fourth embodiments.

FIGS. 14 and 15 show situations before and after the panel 3 for analysis having the cover 18 is set to the holding member 101 for the panel for analysis. The position at which the panel 3 for analysis is mounted to the holding member 101 for the panel for analysis differs from the positions in the first to fourth embodiments.

More specifically, in the first to fourth embodiments, the panel 3 for analysis is disposed further towards the outer periphery than the axis center 11 of the holding member 101 for the panel for analysis. However, in the present fifth embodiment, the panel 3 for analysis is mounted so that the injection port 14 of the panel 3 for analysis traverses the axis center 11 of the holding member 101 for the panel for analysis. In addition, as shown in FIG. 15, an absorbing member 22 is disposed as necessary inside the cover 18 across a gap 24 and at a position opposing the injection port 14 when the cover 18 is closed.

With such a configuration, when injecting a predetermined amount of a sample liquid through the injection port 14, mounting the panel 3 for analysis in a state where the cover 18 is closed on the holding member 101 for the panel for analysis, and rotationally driving the motor 102, the sample liquid in the retaining chamber 4 moves in the direction of an arrow 25 from the axis center 11 to the side of the reagent chamber 5 in the same manner as in the previous embodiments. On the other hand, a sample liquid droplet 19 adhered in the vicinity of the injection port 14 is moved in the direction of an arrow 26 by centrifugal force and collected by the cover 18. When the absorbing member 22 is provided on the inner side of the cover 18, the sample liquid droplet 19 is transferred to the absorbing member 22 and ultimately absorbed by the absorbing member 22. In other words, the fifth embodiment is structured such that, by closing the cover 18, the sample liquid droplet 19 adhered in the vicinity of the injection port 14 can be blocked and prevented from being discharged outwards. Consequently, an effect is achieved in that the fifth embodiment is suitable as a disposable panel for analysis that can be discarded as-is without having to open the cover after analysis and without causing contamination.

A nonwoven fabric or the like made of, for example, polypropylene or a paper material can be used as the absorbing member 22. The absorbing member 22 need only be large enough to accept a sample liquid adhered in the vicinity of the injection port 14.

As described above, by utilizing, without modification, the action of the centrifugal force that is used for transferring the sample liquid in the retaining chamber 4 of the panel 3 for analysis to the reagent chamber 5 and beyond, the sample liquid droplet 19 adhered in the vicinity of the injection port 14 can be reliably collected inside the cover 18.

(Sixth Embodiment)

FIGS. 16 to 19A, 19B, and 19C depict a sixth embodiment of the present invention.

While the positional relationship between an axis center 11 and a panel 3 for analysis having a cover 18 when the panel 3 for analysis is mounted on a holding member 101 for the panel for analysis is the same as the fourth embodiment, in the sixth embodiment, a recessed section 23 is provided inside the cover 18.

Figure 17:
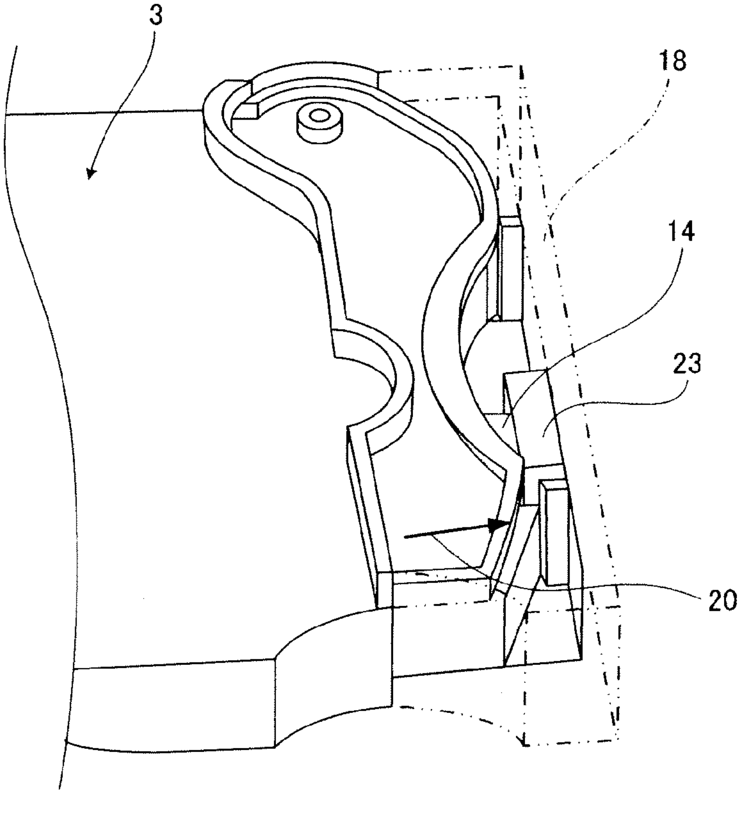
FIG. 17 is a perspective view seeing through the cover in a state where the cover is closed, according to the sixth embodiment.
Figure 18:
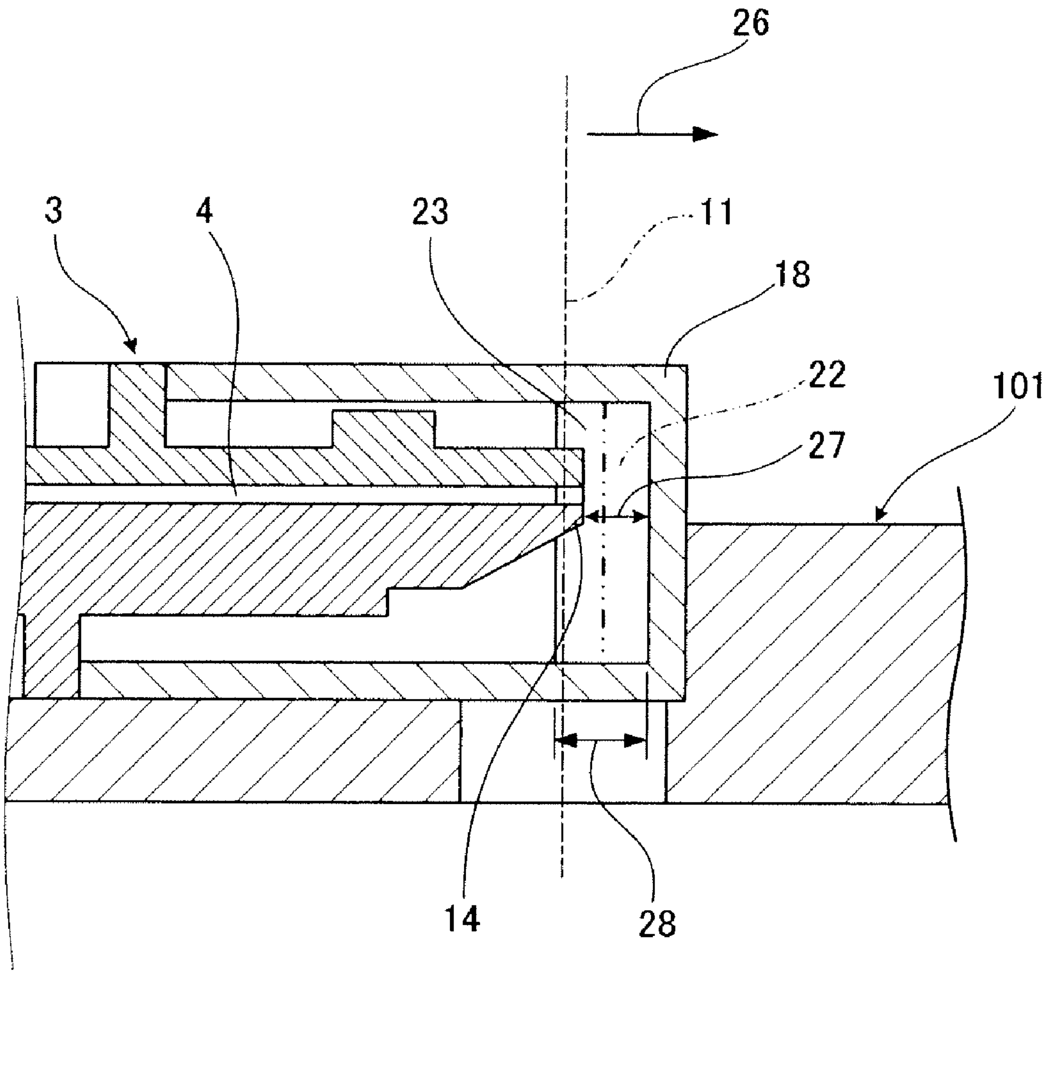
FIG. 18 is a cross sectional-diagram of the periphery of an injection port in a state where the panel for analysis is mounted on an analyzer.

As shown in FIGS. 17 and 18, in a state where the cover 18 is closed, an injection port 14 of the panel 3 for analysis is desirably set at a position separated from the bottom of the cover 18 by a distance 27 so that the injection port 14 does not come into contact with the bottom of the cover 18. The amount of protrusion 28 of the recessed section 23 that protrudes from the bottom of the cover 18 towards the side of the injection port 14 and which surrounds the outside of the injection port 14 at a distance is set so that the tip of the injection port 14 penetrates into the recessed section 23 through an opening of the recessed section 23.

With such a configuration, when injecting a predetermined amount of a sample liquid through the injection port 14, mounting the panel 3 for analysis with the cover 18 closed on the holding member 101 for the panel for analysis, and rotationally driving the panel 3 for analysis with a motor 102, the sample liquid in the retaining chamber 4 moves in the direction of an arrow 25 from the axis center 11 to the side of the reagent chamber 5 in the same manner as in the previous embodiments. On the other hand, a sample liquid droplet 19 adhered in the vicinity of the injection port 14 is moved in the direction of an arrow 26 by centrifugal force and collected by the recessed section 23 of the cover 18. In other words, the sixth embodiment is structured such that, by closing the cover 18, the sample liquid droplet 19 adhered in the vicinity of the injection port 14 can be blocked and prevented from being discharged outwards. Consequently, an effect is achieved in that the sixth embodiment is suitable as a disposable panel for analysis that can be discarded as-is without having to open the cover after analysis and without causing contamination.

After injecting a predetermined amount of a sample liquid droplet into the panel 3 for analysis, the panel 3 for analysis is mounted to the holding member 101 for the panel for analysis. Although the number of revolutions generally necessary for transferring the sample liquid droplet is 1000 rpm or more, when hydrophilic processing using a surfactant or the like is performed on the entire inner periphery of the recessed section 23 and on the vicinity of the injection port 14 to which the sample liquid droplet 19 is expected to adhere, it is possible to transfer the sample liquid droplet to the bottom of the recessed section 23 and collect the sample liquid droplet by applying a centrifugal force generated by a rotation of only several hundred rpm.

In addition, when an absorbing member 22 is provided as necessary at the recessed section 23 as indicated by a virtual line in FIG. 18, the sample liquid droplet 19 adhered in the vicinity of the injection port 14 is ultimately absorbed by the absorbing member 22. Consequently, an effect is achieved in that even when the opening of the recessed section 23 is tilted downwards allowing gravitational force to act, the sample liquid can be prevented from leaking out of the absorbing member 22 or from being transferred to the injection port 14 to re-adhere on the injection port 14.

Furthermore, the structure of the recessed section 12 similar to the first embodiment can be provided inside the cover 18.

Figure 19A:
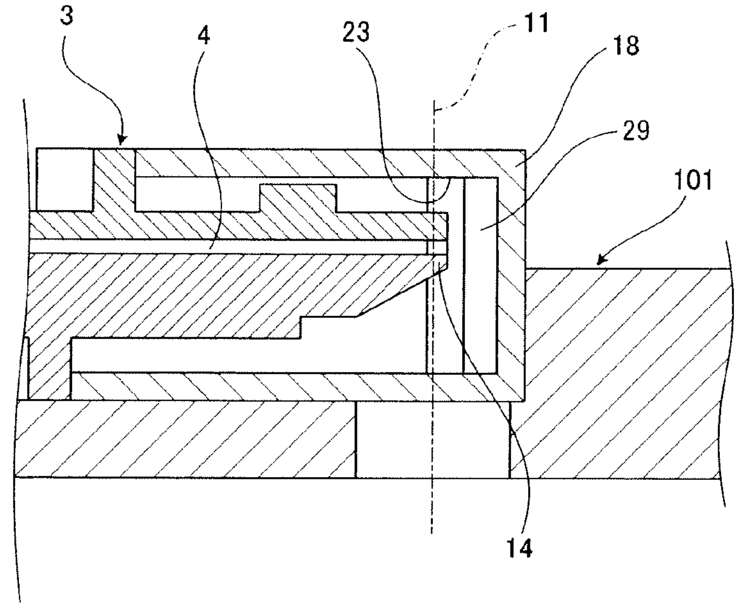
FIG. 19A is a cross sectional-view of the periphery of an injection port according to a different embodiment.
Figure 19B:
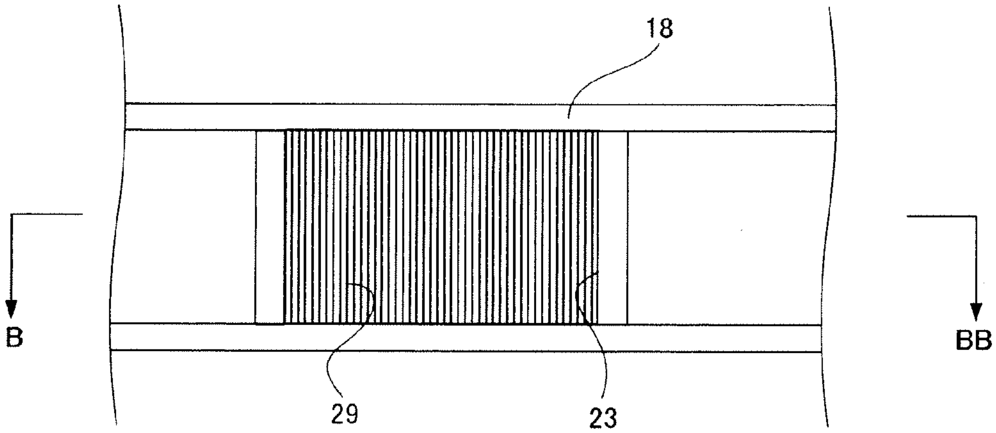
FIG. 19B is a front view of a cover as seen from the injection port.
Figure 19C:
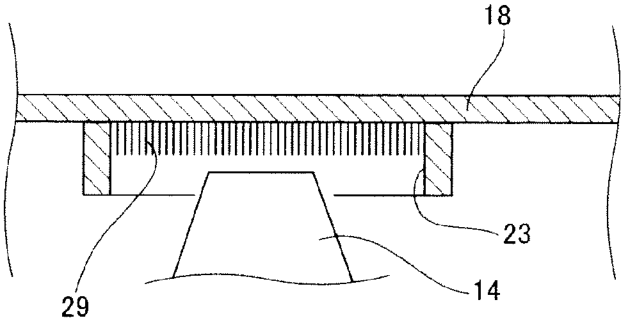
FIG. 19C is a horizontal cross sectional-diagram of the cover.
Figure 20A:
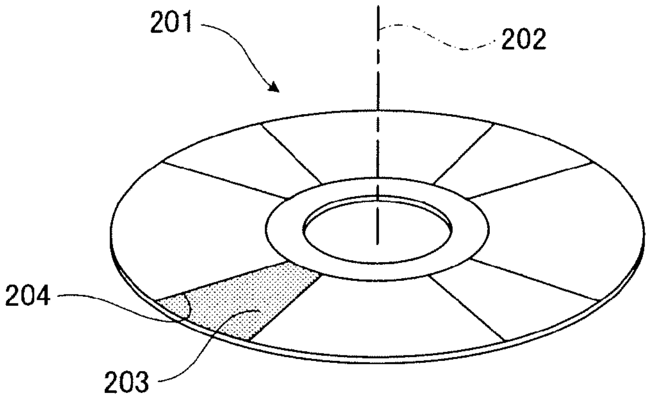
FIG. 20A PRIOR ART
FIG. 20A is an overall perspective view of a state in which a conventional panel for analysis is mounted to a holding member for the panel for analysis.
Figure 20B:
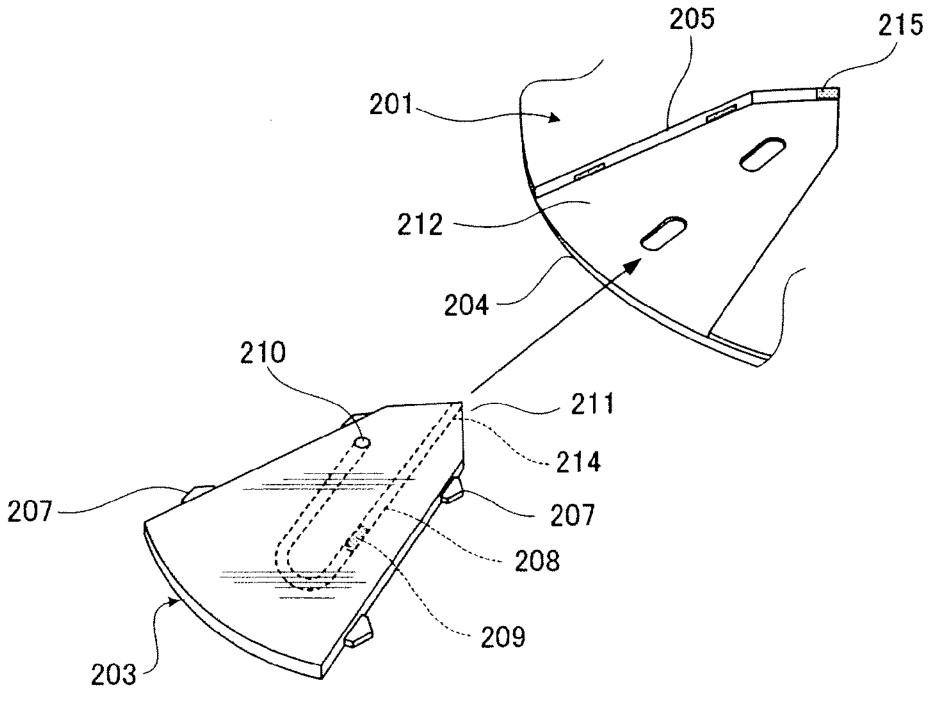
FIG. 20B PRIOR ART
FIG. 20B is a perspective view broken down into the conventional panel for analysis and the holding member for the panel for analysis.

Moreover, a groove which is continuous with the recessed section 23 and which retains the sample liquid by capillary force may be formed inside the cover 18. More specifically, a configuration is provided as shown in FIGS. 19A, 19B, and 19C. FIG. 19A shows a cross-sectional diagram of the periphery of an injection port in a state where the panel 3 for analysis according to the present embodiment is mounted to the holding member 101 for the panel for analysis in an analyzer. FIG. 19B shows a front view of the inside of the cover 18 as seen from the direction of the injection port 14. FIG. 19C is a cross-sectional diagram taken along B-BB in FIG. 19B and is a horizontal cross-section diagram of the state shown in FIG. 19A. As described above, a large number of bulkheads 29 are provided on the bottom of the recessed section 23. An interval between adjacent bulkheads 29 is set to an interval that enables absorption by capillary force and retention of an incoming airborne sample liquid droplet 19. The sample liquid droplet 19 adhered around the injection port 14 due to the rotation of the holding member 101 of the panel for analysis travels through the air to the bulkheads 29 and is retained between the respective bulkheads 29.

Industrial Applicability

Since an analyzer according to the present invention enables procedures up to measurement after reaction of a sample liquid and an analyzing reagent to be performed on a panel for analysis expeditiously and, particularly with respect to injecting a sample liquid, provides significantly easy operability as well as significantly high safety in terms of preventing contamination, the analyzer is useful for analyzing blood and the like.

The invention claimed is:

1. A panel for analysis comprising:

a reagent chamber for retaining an analyzing reagent and for mixing the analyzing reagent with a sample liquid injected from outside the panel for analysis;

a measurement chamber region for performing measurement of the sample liquid mixed with the analyzing reagent supplied from the reagent chamber;

a recessed section which is formed in a lateral face of a periphery of the panel for analysis and which is recessed toward an inner portion of the panel for analysis;

a protruding section having a proximal end connected to a bottom face of the recessed section, and a distal end protruding from the lateral face of the panel for analysis;

an injection port which is open at the distal end of the protruding section; and a retaining chamber for temporarily retaining the sample liquid dispensed as a drop on the injection port, the retaining chamber connecting, through an inner portion of the protruding section, the injection port on one end and the reagent chamber on the other end.

2. A panel for analysis comprising:

a reagent chamber for retaining an analyzing reagent and for mixing the analyzing reagent with a sample liquid injected from outside the panel for analysis;

a measurement chamber region for performing measurement of the sample liquid mixed with the analyzing reagent supplied from the reagent chamber;

a recessed section which is formed in a lateral face of a periphery of the panel for analysis and which is recessed toward an inner portion of the panel for analysis;

a protruding section having a proximal end connected to a bottom face of the recessed section and a distal end surrounded by the recessed section, the distal end protruding substantially in a vicinity of the lateral face;

an injection port which is open at the distal end of the protruding section;

a retaining chamber for temporarily retaining the sample liquid dispensed as a drop on the injection port, the retaining chamber connecting, through an inner portion of the protruding section, the injection port on one end and the reagent chamber on the other end; and an absorbing material disposed on the bottom face of the recessed section to absorb the sample liquid.

3. A panel for analysis comprising:

a reagent chamber for retaining an analyzing reagent and for mixing the analyzing reagent with a sample liquid injected from outside the panel for analysis;

a measurement chamber region for performing measurement of the sample liquid mixed with the analyzing reagent supplied from the reagent chamber;

a recessed section which is formed in a lateral face of a periphery of the panel for analysis and which is recessed toward an inner portion of the panel for analysis;

a protruding section having a proximal end connected to a bottom face of the recessed section and a distal end surrounded by the recessed section, the distal end protruding substantially in a vicinity of the lateral face;

an injection port which is open at the distal end of the protruding section;

a retaining chamber for temporarily retaining the sample liquid dispensed as a drop on the injection port, the retaining chamber connecting, through an inner portion of the protruding section, the injection port on one end and the reagent chamber on the other end; and a grooved section communicating with the bottom face of the recessed section for retaining the sample liquid by capillary force.

4. The panel for analysis according to any one of claims 1, 2, and 3, wherein a cross-sectional area of the recessed section at an opening of the recessed section is equal to or greater than a cross-sectional area of the recessed section at an end of the recessed section.

5. The panel for analysis according to claim 3, wherein the recessed section communicates with the reagent chamber via the grooved section, and the grooved section is shaped to cause a portion of a sample liquid which is transferred to the recessed section by centrifugal force generated by rotation of the panel for analysis, to be further transferred to the reagent chamber.

6. The panel for analysis according to any one of claims 1, 2, and 3, wherein the panel for analysis includes a cover which moves between a closed position for covering the protruding section, the injection port, and the recessed section, and an open position for exposing the protruding section, the injection port, and the recessed section.

7. The panel for analysis according to any one of claims 1, 2, and 3, wherein the panel for analysis includes a cover which moves between a closed position for covering the protruding section, the injection port, and the recessed section, and an open position for exposing the protruding section, the injection port, and the recessed section; and an absorbing material inside the cover, for absorbing a sample liquid.

8. The panel for analysis according to any one of claims 1, 2, and 3, wherein the panel for analysis includes a cover which moves between a closed position for covering the protruding section, the injection port, and the recessed section, and an open position for exposing the protruding section, the injection port, and the recessed section;

an absorbing material inside the cover, for absorbing a sample liquid; and a gap which is between the injection port and the absorbing material when the cover is in the closed position.

9. The panel for analysis according to any one of claims 1, 2, and 3, wherein a surfactant is on at least one of a surface of a peripheral section of the protruding section and a surface of a peripheral section of the recessed section.

10. An analyzer comprising:

a panel for analysis according to any one of claims 1, 2, and 3; and a holding member for the panel for analysis; wherein the panel for analysis is for transferring a sample liquid dispensed as a drop on the injection port, through the reagent chamber, to the measurement chamber region, by centrifugal force generated by rotating the holding member, and for performing analysis by optically accessing a sample liquid in the measurement chamber region and detecting a signal, wherein the panel for analysis includes a cover which moves between a closed position for covering the protruding section, the injection port, and the recessed section, and an open position for exposing the protruding section, the injection port, and the recessed section; and the analyzer is arranged for performing an analysis operation by mounting the panel for analysis wherein the cover is in the closed position, to the holding member so that the injection port traverses an axis of rotation of the holding member.

11. The panel for analysis according to any one of claims 1, 2, and 3, wherein the panel for analysis includes a cover which moves between a closed position for covering the protruding section, the injection port, and the recessed section, and an open position for exposing the protruding section, the injection port, and the recessed section; and a recessed section inside the cover, for collecting a portion of a sample liquid adhered in a vicinity of the injection port.

12. The panel for analysis according to any of claims 1, 2, and 3, wherein the panel for analysis includes a cover which moves between a closed position for covering the protruding section, the injection port, and the recessed section, and an open position for exposing the protruding section, the injection port, and the recessed section;

a plurality of bulkheads for collecting a portion of a sample liquid adhered in a vicinity of the injection port, are inside the cover; and an interval between the bulkheads is set to an interval that enables absorption by capillary force and retention of an incoming airborne sample liquid droplet.

* * * * *